(12) United States Patent
Kummer

(10) Patent No.: US 9,307,274 B2
(45) Date of Patent: *Apr. 5, 2016

(54) MANAGING REMOTE DISTRIBUTION OF CONTENT RECORDED AT A TELEVISION RECEIVER

(71) Applicant: EchoStar Technologies, LLC, Englewood, CO (US)

(72) Inventor: David Kummer, Highlands Ranch, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/453,342

(22) Filed: Aug. 6, 2014

(65) Prior Publication Data

US 2014/0351869 A1 Nov. 27, 2014

Related U.S. Application Data

(63) Continuation of application No. 13/791,636, filed on Mar. 8, 2013, now Pat. No. 8,832,743.

(60) Provisional application No. 61/611,483, filed on Mar. 15, 2012, provisional application No. 61/739,536, filed on Dec. 19, 2012.

(51) Int. Cl.
*H04N 21/2387* (2011.01)
*H04N 5/91* (2006.01)
(Continued)

(52) U.S. Cl.
CPC ........... *H04N 21/2387* (2013.01); *H04N 5/782* (2013.01); *H04N 5/91* (2013.01); *H04N 21/21815* (2013.01); *H04N 21/2383* (2013.01); *H04N 21/23439* (2013.01); *H04N 21/2402* (2013.01); *H04N 21/25808* (2013.01); *H04N 21/25866* (2013.01); *H04N 21/2662* (2013.01); *H04N 21/4147* (2013.01); *H04N 21/4334* (2013.01); *H04N 21/4335* (2013.01); *H04N 21/47214* (2013.01); *H04N 21/47217* (2013.01); *H04N 21/6143* (2013.01); *H04N 21/6193* (2013.01); *H04N 21/6582* (2013.01); *H04N 5/765* (2013.01); *H04N 21/26606* (2013.01); *H04N 21/4181* (2013.01); *H04N 21/4623* (2013.01)

(58) Field of Classification Search
CPC ............ H04N 21/4516; H04N 21/482; H04N 5/44543; H04N 21/2383; H04N 21/2387
See application file for complete search history.

(56) References Cited

U.S. PATENT DOCUMENTS 5,016,273 A 5/1991 Hoff
8,832,743 B2 * 9/2014 Kummer .......................... 725/47
(Continued)

*Primary Examiner* — Huy T Nguyen
(74) *Attorney, Agent, or Firm* — Kilpatrick Townsend & Stockton LLP

(57) ABSTRACT

Various arrangements for providing remote access to locally-recorded television programming is presented. In some embodiments, a DVR is presented that it is configured to receive input indicating a timer for recording a television channel during a time period. The DVR may record television programming on the television channel during the time period indicated by the timer. The television receiver may further receive input indicating the television programming is to be stored remotely. The DVR may transmit the television programming to a media distribution management system via a second network. The DVR may transmit an indication of a user account to the media distribution management system via the second network.

20 Claims, 7 Drawing Sheets

(51) Int. Cl.

| | | |
|---|---|---|
| *H04N 5/782* | (2006.01) | |
| *H04N 21/218* | (2011.01) | |
| *H04N 21/2343* | (2011.01) | |
| *H04N 21/24* | (2011.01) | |
| *H04N 21/258* | (2011.01) | |
| *H04N 21/2662* | (2011.01) | |
| *H04N 21/4147* | (2011.01) | |
| *H04N 21/433* | (2011.01) | |
| *H04N 21/4335* | (2011.01) | |
| *H04N 21/472* | (2011.01) | |
| *H04N 21/61* | (2011.01) | |
| *H04N 21/658* | (2011.01) | |
| *H04N 21/2383* | (2011.01) | |
| *H04N 5/765* | (2006.01) | |
| *H04N 21/266* | (2011.01) | |
| *H04N 21/418* | (2011.01) | |
| *H04N 21/4623* | (2011.01) | |

(56) References Cited

U.S. PATENT DOCUMENTS

| | | |
|---|---|---|
| 2001/0046366 A1 | 11/2001 | Susskind |
| 2002/0046407 A1 | 4/2002 | Franco |
| 2008/0320183 A1 | 12/2008 | Fyock |
| 2009/0142036 A1 | 6/2009 | Branam et al. |
| 2011/0030024 A1 | 2/2011 | Pasko et al. |
| 2011/0032856 A1 | 2/2011 | Ozawa |
| 2012/0284765 A1 | 11/2012 | Killick et al. |

\* cited by examiner

MANAGING REMOTE DISTRIBUTION OF CONTENT RECORDED AT A TELEVISION RECEIVER

CROSS REFERENCES TO RELATED APPLICATIONS

This application is a continuation of U.S. patent application Ser. No. 13/791,636, filed Mar. 8, 2013, entitled "Managing Remote Distribution of Content Recorded at a Television Receiver," which claims priority to U.S. provisional application 61/611,483, filed Mar. 15, 2012, entitled "Reception, Recording, Storage, and Manipulation of Multiple Television Channels," and U.S. provisional application 61/739,536, filed Dec. 19, 2012, entitled "Managing Remote Distribution of Content Recorded at a Television Receiver," the entire disclosures of which is hereby incorporated by reference for all purposes.

BACKGROUND

A Digital Video Recorder (DVR) may allow a user to record a television program for viewing at a later time. The user may specify a time period, date, and television channel to be recorded. In response, the specified television channel may be recorded at the specified date and time period. Such an arrangement may be useful if the user intends on watching the recorded television programming at a television local to the DVR. However, if the user is geographically separated from the DVR, the user may not be able to access the recorded television programming remotely.

SUMMARY

In some embodiments, a system for providing remote access to television programming recorded using a television receiver is provided. The television receiver may be configured to receive input indicating a timer for recording a television channel during a time period. The television receiver may be configured to record television programming on the television channel during the time period indicated by the timer, wherein the television channel is received via a television distribution network. The television receiver may be configured to receive input indicating the television programming is to be stored remotely. The television receiver may be configured to transmit the television programming to a media distribution management system via a second network. The television receiver may be configured to transmit an indication of a user account to the media distribution management system via the second network.

Embodiments of such a system may include one or more of the following: The television receiver may be configured to, in response to the media distribution management system successfully receiving the television programming, delete the television programming. The system may include the media distribution management system. The media distribution management system may be configured to receive the television programming from the television receiver, via the second network. The media distribution management system may be configured to store the television programming. The media distribution management system may be configured to receive, via the second network, the indication of the user account from the television receiver. The media distribution management system may be configured to link the stored television programming with the user account, such that the stored television programming is only accessible in association with the user account. The media distribution management system may be configured to encode the stored television programming linked with the user account into a plurality of versions of the stored television programming. Each version of the plurality of versions of the stored television programming may have a different average bitrate. The media distribution management system may be configured to store each version of the plurality of versions of the stored television programming. The media distribution management system may be configured to receive a request from a user device, wherein the request indicates the user account and a type of the user device. The media distribution management system may be configured to select a version of the plurality of versions of the stored television programming based on the type of the user device.

Additionally or alternatively, embodiments of such a system may include one or more of the following: The media distribution management system may be configured to stream the selected version of the plurality of versions of the stored television programming to the user device. The media distribution management system may be configured to, in response to receiving the television programming and the indication of the user account from the television receiver, scheduling encoding of the stored television programming into the plurality of versions of the stored television programming. The media distribution management system may be configured to encode the stored television programming linked with the user account into the plurality of versions of the stored television programming occurs at a scheduled time. The media distribution management system may be configured to, in response to the request from the user device being received prior to the scheduled time, the stored television programming linked with the user account into a version of the stored television programming at a bitrate associated with the user device. The version may be part of the plurality of versions of the stored television programming. Each remaining version of the plurality of versions of the stored television programming may be created at or later than the scheduled time. The media distribution system may be configured to receive indications of a plurality of user devices associated with the user account. The media distribution system may be configured to determine, using the indications of the plurality of user devices associated with the user account, a plurality of bitrates associated with the plurality of user devices, wherein each version of the plurality of versions of the stored television programming corresponds to a bitrate of the plurality of bitrates. The television receiver may be further configured to transmit an indication of one or more user devices to the media distribution management system. The television distribution network may be satellite based.

In some embodiments, a method for providing remote storage of television programming recorded using a television receiver may be provided. The method may include receiving, by the television receiver from a user, input indicating a timer for recording a television channel during a time period. The method may include recording, by the television receiver, television programming on the television channel during the time period indicated by the timer, wherein the television channel is received via a television distribution network. The method may include receiving, by the television receiver, input indicating the television programming is to be stored remotely. The method may include transmitting, by the television receiver, the television programming to a media distribution management system. The method may include transmitting, by the television receiver, an indication of a user account to the media distribution management system.

Embodiments of such a method may include one or more of the following: The method may include, in response to the indication from the media distribution management system indicating successful receipt of the television programming, deleting the television programming by the television receiver. The method may include receiving, by the media distribution management system, the television programming from the television receiver. The method may include storing, by the media distribution management system, the television programming. The method may include receiving, by the media distribution management system, the indication of the user account from the television receiver. The method may include linking, by the media distribution management system, the stored television programming with the user account, such that the stored television programming is only accessible in association with the user account. The method may include encoding, by the media distribution management system, the stored television programming linked with the user account into a plurality of versions of the stored television programming. Each version of the plurality of versions of the stored television programming may have a different average bitrate. The method may include storing, by the media distribution management system, each version of the plurality of versions of the stored television programming.

Additionally or alternatively, embodiments of such a method may include one or more of the following: The method may include receiving, by the media distribution management system, a request from a user device, wherein the request indicates the user account and a type of the user device. The method may include selecting, by the media distribution management system, a version of the plurality of versions of the stored television programming based on the type of the user device. The method may include streaming, by the media distribution management system, the selected version of the plurality of versions of the stored television programming to the user device. The method may include, in response to receiving the television programming and the indication of the user account from the television receiver, scheduling, by the media distribution management system, encoding of the stored television programming into the plurality of versions of the stored television programming. The method may include encoding, by the media distribution management system, the stored television programming linked with the user account into the plurality of versions of the stored television programming occurs at a scheduled time. The method may include, in response to the request from the user device being received prior to the scheduled time, encoding the stored television programming linked with the user account into a version of the stored television programming at a bitrate associated with the user device. The version may be part of the plurality of versions of the stored television programming. Each remaining version of the plurality of versions of the stored television programming may be created at or later than the scheduled time. The method may include receiving, by the media distribution management system, indications of a plurality of user devices associated with the user account. The television distribution network may be satellite based.

In some embodiments, a non-transitory processor-readable medium for providing remote storage of television programming recorded using a television receiver is presented. The non-transitory processor-readable medium may comprising processor-readable instructions configured to cause one or more processors to receive input indicating a timer for recording a television channel during a time period. The instructions may be further configured to cause the one or more processor to record television programming on the television channel during the time period indicated by the timer, wherein the television channel is received via a television distribution network. The instructions may be further configured to cause the one or more processor to receive input indicating the television programming is to be stored remotely. The instructions may be further configured to cause the one or more processor to cause the television programming to be transmitted to a media distribution management system via a network.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
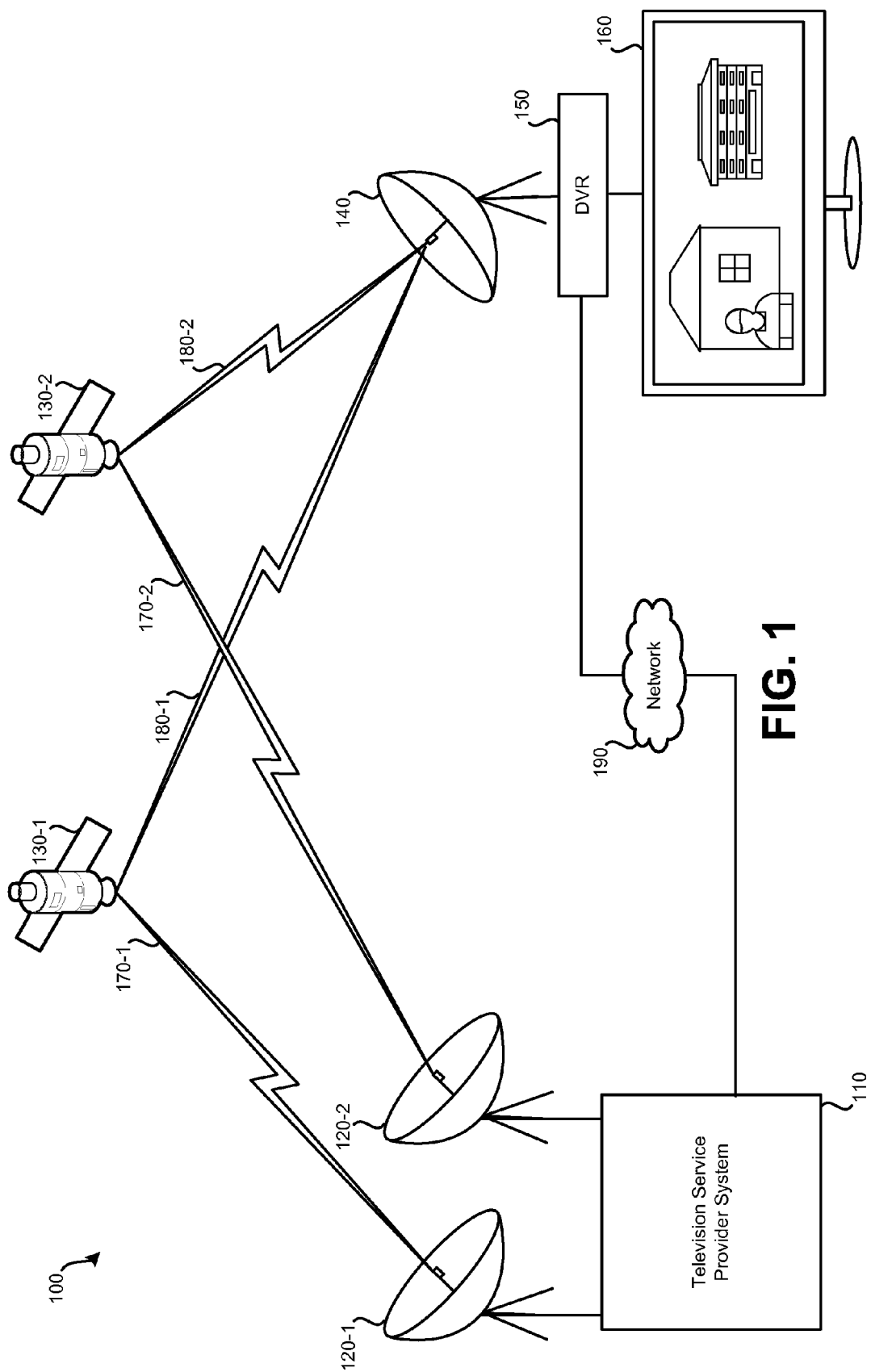
FIG. 1 illustrates an embodiment of a satellite television distribution system.

Within a house, building, apartment, or other form of location, a television receiver (such as a cable or satellite set-top box), may be used to receive and decode television programming and/or record television programming for viewing at a later time. Many television receivers are integrated with digital video recorder (DVR) which are utilized to digitally store television programming for presentation at a later time. Typically, a user may configure the DVR using a timer, which indicates a television channel, a time period, and a date during which the user desires television programming to be recorded. Also, the user may select television programming via an electronic programming guide (EPG) that the user desires to record.

Such an arrangement may be useful if the user intends on watching the recorded television programming via the same DVR (and likely the same television) at which the recording occurred. However, some users may move among locations having different television receivers or may desire to view content using different display devices. While a user may record television programming using a television receiver's DVR for viewing on a coupled television, the user may desire to view the television programming via another device, such a smartphone, tablet computer or even another television at a different location. As an example, the user may set a timer that causes the user's DVR to record television programming on a television channel at a particular date during a particular time period. However, the user may desire to watch the recorded television programming via a tablet computer while in a coffee shop (via a wireless network).

Throughout this document, reference is made to television receivers, STBs and DVRs. It should be understood that disclosure directed to a STB or standalone DVR (such as a cable or satellite receiver with integrated recording functionality) is also applicable to television receivers or recording devices integrated into displays (such as a television) and other devices. Similarly, disclosure directed to DVRs is applicable to set top boxes and other television receiving devices.

A timer may initially be set by a user to record television programming. The user, using an interface of the DVR or some other user device, such as a cell phone or tablet computer, may specify television programming that the user desires to record. The user may select a television program from an electronic programming guide (EPG) or may specify a television channel, a time period, and a date. In some embodiments, the timer may be set directly (e.g., via a remote control) at the DVR that is to record the television programming. In some embodiments, a timer may be set from a user device, via an Internet connection, such as a web site. In such embodiments, a timer may be transmitted to a timer management computer system, which may be operated by the television service provider.

The timer management system may attempt to communicate with one or more DVRs linked to the user's account. As a first attempt, the timer management system may try using an internet connection (e.g., via a cable network) to communicate with each DVR. If successful, the timer management system may provide the timer, thus programming the DVR to record the television programming indicated by the timer. However, if the internet connection is not available for a DVR linked with the user's account, the timer management system may attempt to use a different communication path to communicate with the DVR. If the DVR receives television channels via a satellite-based television distribution system, an indication of the timer may be sent via satellite to the DVR that were unavailable via the internet connection. The timer management system may create an entitlement management message (EMM) that is addressed to a specific DVR linked with the user's account or group. This EMM may be transmitted via the television service provider's satellite-based distribution system to a large number of STBs, including those not associated with the user. Only the intended STB/DVR may respond to the EMM due to an address (e.g., a serial number of a smartcard of the STB) being present within the EMM; other STBs may ignore the EMM. The EMM may be transmitted to the STB via satellite on one or more transponder streams that are received by the STB.

Whether received directly at an DVR or via a timer management system, once a timer is set at the DVR, at the time period and date specified by the timer, the STB may record the specified television channel. The television programming may be recorded by the DVR as received via a satellite-based television distribution system in local storage associated with the DVR (such as an internal or external hard drive or other recording medium). At the time of creating the timer, after the timer is set, or after the television programming is recorded, the user may provide an indication that the television programming is desired to be presented at a user device other than a television connected with the DVR at which the recording occurred. The television programming may be transmitted to a media distribution management system (MDMS). The television programming may be transmitted to the MDMS via a network other than the television distribution system through which the television programming was received. For example, the television programming may be received by the DVR over a satellite distribution system and may be transmitted from the DVR to the MDMS over a separate Internet connection. Once successfully received by the MDMS, the television programming may be deleted from storage at the DVR (such deletion may be for compliance with copyright laws).

The television programming may be converted by the MDMS into one or more different formats that are appropriate to stream to user devices. For instance, multiple versions of the television programming may be created in different formats and/or bitrates. Each of these encoded multiple variable bitrate versions may be accessible only via the user account associated with the DVR at which the television programming is recorded. As such, if a different user records the same television programming, separate files for the television programming and the multiple variable bitrate versions of the television programming may be maintained by the MDMS.

The encoding to the multiple versions may occur at a scheduled time. While the television programming recorded at the DVR may be received by the media distribution management system at a first time, encoding of the television programming into the multiple versions may not occur until a later second time at which the media distribution management system has available processing resources to perform the encoding. In some embodiments, television programming received by the MDMS may be encoded into predefined formats and/or bitrates. In other embodiments, a user may specify various user devices at which the user may view the television programming. The versions that are encoded by the MDMS may be based on the types of these user devices. In some embodiments, the versions are based on user devices that have previously been registered with the user's account.

Upon receiving a request from a user device associated with the user account for the television programming, a particular version of the television programming may be selected by the MDMS based on the type of the user device and/or an amount of bandwidth available for communication via network with the user device. Which version is streamed, or otherwise be transferred, to the user device may vary based on the network bandwidth available for communication between the user device and the MDMS.

FIG. 1 illustrates an embodiment of a satellite television distribution system 100. Satellite television distribution system 100 may include: television service provider system 110, satellite transmitter equipment 120, satellites 130, satellite dish 140, DVR 150, and television 160. Alternate embodiments of satellite television distribution system 100 may include fewer or greater numbers of components. While only one satellite dish 140, DVR 150 or other receiving device, and television 160 (collectively referred to as "user equipment") are illustrated, it should be understood that multiple (e.g., tens, thousands, millions) instances of user equipment may receive television signals from satellites 130. For example, a particular person may have user equipment at multiple homes or other locations. While the embodiments are described herein in the context of a satellite television distribution system, it is to be appreciated that the techniques may also be applicable in other distribution networks, such as cable, terrestrial, of internet protocol television (IPTV) systems.

Television service provider system 110 and satellite transmitter equipment 120 may be operated by a television service provider. A television service provider may distribute television channels, on-demand programming, programming information, and/or other services to users via satellite. Television service provider system 110 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites in the form of transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances satellite transmitting equipment may communicate with the same or with different satellites. Different television channels may be transmitted to satellites 130 from different instances of transmitting equipment. For instance, a different satellite dish of transmitting equipment 120 may be used for communication with satellites in different orbital slots. A television channel may contain content distributed by a particular television channel. Embodiments detailed herein that involve television channels may also (or instead) by applied to television programming streams or some other programming distribution arrangement in which programming is received by a DVR device.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from downlink signals 180. Satellites 130 may be in geosynchronous orbit. Each satellite 130 may be in a different orbital slot, such that the signal path between each satellite, uplink stations, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, transmitter equipment 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of receiving device (such as DVR 150) and/or satellite dish 140, it may only be possible to capture transponder streams from a limited number of transponders concurrently. For example, a tuner of DVR 150 may only be able to tune to a single transponder stream from a transponder of a single satellite at a time.

In communication with satellite dish 140, may be one or more sets of receiving equipment, such as integrated DVR/satellite receivers or standalone satellite receivers without recording functionality. Receiving equipment may be configured to decode signals received from satellites 130 via satellite dish 140 for display on a display device, such as television 160. Receiving equipment may be incorporated as part of a television or may be part of a separate device, commonly referred to as a set-top box (STB) or a DVR/STB, referred to herein as a DVR. Receiving equipment may include a satellite tuner configured to receive television channels via a satellite. In FIG. 1, receiving equipment is present in the form of DVR 150. As such, DVR 150 may decode signals received via satellite dish 140 and provide an output to television 160.

Television 160 may be used to present video and/or audio decoded by DVR 150. DVR 150 may also output a display of one or more interfaces to television 160, such as an electronic programming guide (EPG). In some embodiments, a display device other than a television may be used.

Uplink signal 170-1 represents a signal between transmitter equipment 120 and satellite 130-1. Uplink signal 170-2 represents a signal between transmitter equipment 120 and satellite 130-2. Each of uplink signals 170 may contain streams of one or more different television channels. For example, uplink signal 170-1 may contain a certain group of television channels, while uplink signal 170-2 contains a different grouping of television channels. Each of these television channels may be scrambled such that unauthorized persons are prevented from accessing the television channels.

Transponder stream 180-1 represents a signal between satellite 130-1 and satellite dish 140. Transponder stream 180-2 represents a signal path between satellite 130-2 and satellite dish 140. Each of transponder streams 180 may contain one or more different television channels in the form of transponder streams, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example, a typical satellite may relay 32 transponder streams via corresponding transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received. DVR 150 may decode the received transponder stream. As such, depending on which television channel(s) are desired, a transponder stream from a different satellite (or a different transponder of the same satellite) may be accessed and decoded by DVR 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and DVR 150. Via such a secondary communication channel, bidirectional exchange of data may occur. Network 190 may be separate from the satellite-based television distribution system that relies on satellites 130. Data may be transmitted to television service provider system 110 via network 190. Data may also be transmitted from television service provider system 110 to DVR 150 via network 190. Network 190 may be the Internet. While audio and video services may be provided to DVR 150 via satellites 130, feedback from DVR 150 to television service provider system 110 may be transmitted via network 190. Not all STBs may be able to communicate via network 190. For example, even if an STB is capable of communicating using network 190, communication using network 190 may require that the user has an active account with an internet service provider. Accordingly, some STBs may only be able to receive data from satellites 130 via receiving equipment such as satellite dish 140. In other situations, while a user may have an active ISP account, such as via a fiber, cable, or DSL internet connection, equipment failure may occur. For instance, a router through which DVR 150 uses to connect to network 190 may fail or be in need of resetting.

FIG. 1 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems. While FIG. 1 illustrates a single DVR 150 in communication with television service provider system 110, it should be understood that many STBs may be in communication with television service provider system 110. In a cable environment network, video and audio data sent to DVR 150 may use RF channels on a cable in one or more logical or physical networks. This cable may be used for bidirectional communication between the cable service provider and DVR 150, similar to network 190.

FIG. 1 illustrates an exemplary system for delivering television programming to a television receiver (which may be in the form of a DVR). It should be understood that other embodiments may involve television programming being delivered via a cable-based network or IP-based network or some combination thereof. As such, embodiments detailed herein may be applied to television programming delivered via cable-based networks and IP-based networks in addition to satellite-based networks.

Figure 1B:
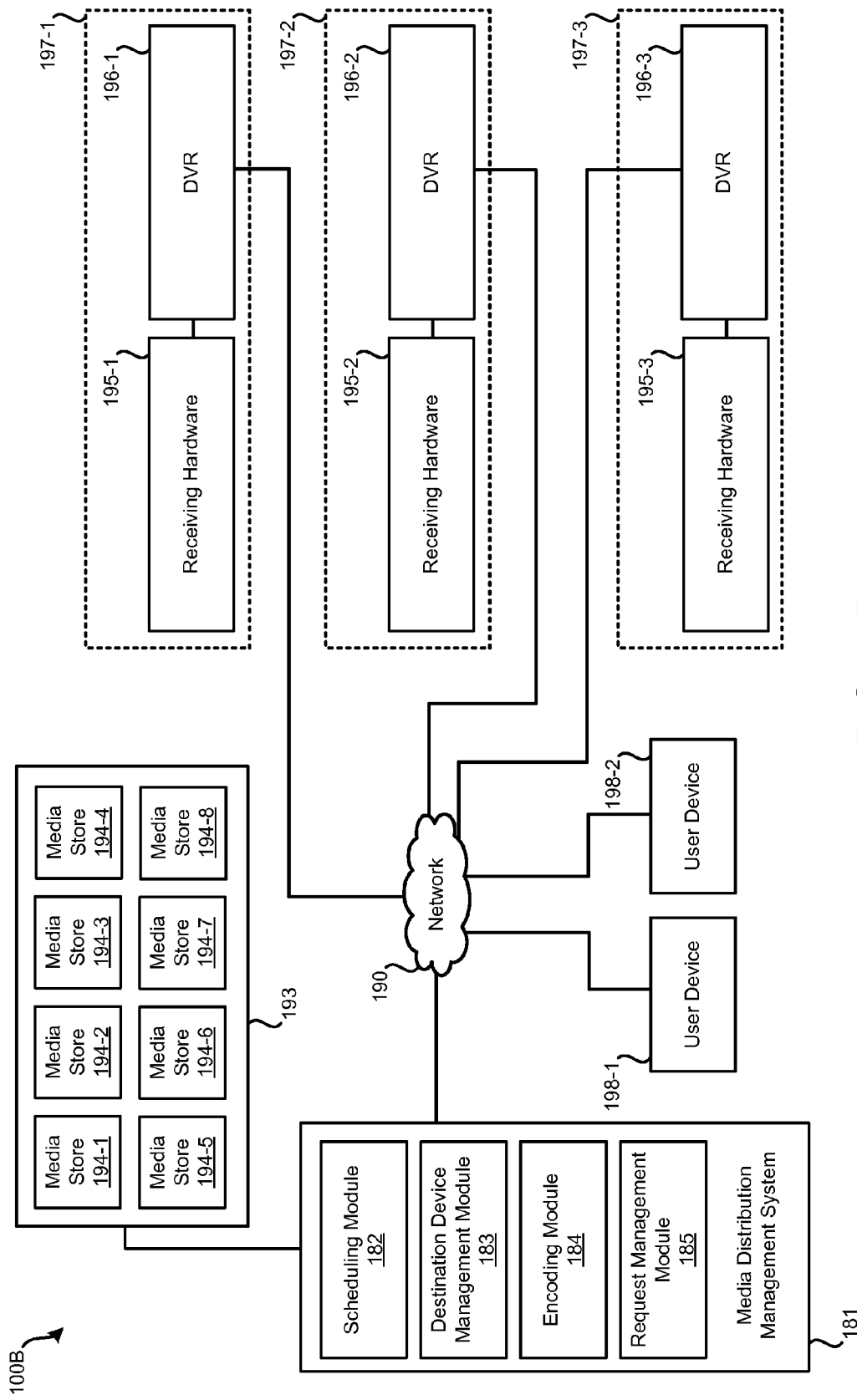
FIG. 1B illustrates an embodiment of a system for providing remote access to television programming recorded at a television receiver.

FIG. 1B illustrates an embodiment of a satellite television distribution system including multiple set-top boxes, each associated with a different user account. Each of DVRs 196 may be in communication with a television service provider, such as television service provider system 110 via network 190 and may receive television programming via satellites 130 of FIG. 1.

Each of the DVRs 196 may be associated with different user accounts. DVRs 196 along with receiving hardware 195 (which may include a satellite dish) may be geographically distributed from each other, at different structures and/or dwellings. As such, DVR 196-1 may be located at a different structure than DVR 196-2. For instance, geographic location 197-1 may be in a different state than geographic location 197-2. Each of the DVRs 196 may use receiving hardware separate from each of the other DVRs 196 to receive television programming. For instance, each of DVRs 196 may be associated with different satellite dishes to receive television programming.

Each of DVRs 196 may be configured to receive television programming via receiving hardware 195. Receiving hardware 195 may be configured to receive television programming via one or more satellites. As such, in some embodiments, all television programming available to be recorded via a DVR timer may be received by receiving hardware 195 from one or more satellites. Each of DVRs 196 may also be configured to communicate with MDMS 181 via network 190. Network 190 may be separate from the satellite-based television distribution system through which the television programming was initially received by receiving hardware 195. MDMS 181 may be part of television service provider system 110 of FIG. 1. When a connection between a particular DVR 196 and MDMS 181 is available via network 190, it may be possible for a DVR to send data to MDMS 181.

User devices 198 may communicate with MDMS 181 via network 190. User devices 198 may represent devices through which a user may set a timer for recording of television programming and/or stream recorded television programming for viewing. For example, user device 198-1 may be a mobile device, such as a cellular phone, while user device 198-2 may be a tablet computer. Other forms of user devices are also possible. Depending on the type of user device, varying resolutions may be supported for presentation of video. For example, a tablet computer may present higher resolution video than a cellular phone. Accordingly, a different bitrate version of the same television programming may be streamed to user device 198-1 than user device 198-2 based on the display resolutions supported by the user devices. When one of user devices 198 requests the streaming of stored television programming, the user device may indicate supported video resolutions, support bitrates, supported formats, a manufacturer of the user device, and/or a model of the user device. Similar information may also be exchanged for audio. Accordingly, based on the data provided by the user device of user devices 198, MDMS may be able to determine one or more appropriate formats for the television programming to stream (or otherwise transfer) to the user device.

Television programming received by MDMS 181 may be maintained separately for each user account. Each media store of media stores 194 may represent media (including television programming) stored for a particular user account. For example, DVR 196-1 may be associated with a first user account. Television programming transferred from DVR 196-1 to MDMS 181 may be stored as part of media store 194-1. DVR 196-2 may be associated with a second user account. Television programming transferred from DVR 196-2 to MDMS 181 may be stored as part of media store 194-2. Sharing of copies of television program at MDMS storage 193 of media between user accounts may be prohibited. Therefore, continuing with the previous example, regardless of whether the same television programming is transferred by DVR 196-1 and DVR 196-2 to MDMS 181, individual copies of the television programming may be maintained in media stores 194-1 and 194-2. While only three DVRs 196 are illustrated (with each possibly associated with a separate user account), eight media stores 194 are illustrated, each associated with different user accounts. It should be understood that number of DVRs, user devices, and media stores illustrated are merely exemplary.

MDMS 181 may contain multiple modules (implemented via hardware, software, firmware, and/or some combination thereof) that perform various tasks regarding television programming received from DVRs 196. When television programming is initially received by MDMS 181, the television programming may be stored in non-transitory computer-readable storage 193 in a media store of media stores 193 associated with the user account from which the television programming was received. It should be understood that each of media stores 194 may be virtually separated (e.g., via folders or some other filing arrangement) on a non-transitory storage medium. If the user indicated one or more types of user devices that are expected to be used to view the television programming, such an indication may be stored.

Scheduling module 182 may schedule a date/time for the television program to be encoded into one or more versions, which may include one or more formats and/or bitrates. Such versions may include variable bitrate versions. Scheduling module 182 may schedule encoding within a predefined time range (e.g., within the next 24 hours). Further, scheduling module 182 may schedule encoding for when MDMS is expected to have available processing resources to perform the encoding. In some embodiments, scheduling module 182 may create a first in, first out schedule. As processing resources become available, television programming is selected from such a schedule for encoding. In some embodiments, scheduling module 182 may base a schedule on viewing characteristics associated with the user account with which the television programming is associated. For example, if after receiving television programming, a user device associated with the user account tends to request the television programming within two hours, scheduling module 182 may schedule the encoding such that one or more versions are created likely ahead of when the television programming will be requested by the user device. If a user device associated with the user account tends to request the television programming days later, scheduling module 182 may schedule the encoding at a later time that still ensures the versions of the television programming are created ahead of when the television programming will likely be requested by the user device. In some embodiments, when television programming is received from a DVR of DVRs 196, an indication may be provided of when the user expects to request the television programming from a user device. This indication may be used by scheduling module 182 to schedule encoding such that encoding occurs ahead of when the television programming is expected to be requested.

In some embodiments, encoding is performed into a predefined selection of bitrates. Such bitrates may be in one or more formats that can be presented on commonly-used user devices. As such, in some embodiments, the television programming is encoded into the same predefined bitrates and/or formats. In other embodiments, the bitrates and/or formats into which television programming is encoded may be based on user devices that have previously been linked with the user account with which the television programming is associated. In some embodiments, a user may register a particular user device with destination device management module (DDMM) 183 of MDMS 181. Based on the user device being registered with DDMM 183, DDMM 183 may cause one or more formats of bitrates that are compatible with the user device to be created. As such, the bitrates and formats into which encoding occurs may be selected based on the types of user devices associated with the user account with which the received television programming is associated.

In some embodiments, when television programming is earmarked by the user to be uploaded to MDMS 181, the user may indicate one or more (types of) user devices from which the user intends on requesting the television programming at a later time. DDMM 183 may cause encoding to occur into one or more formats and/or bitrates that are compatible with the user devices indicated by the user. As an example, when the user selects television programming from an EPG for recording by DVR 196-3, the user may also specify that the television programming is to be uploaded to MDMS 181 and that the user intends on viewing the television programming via a tablet computer. DDMM 183 may cause encoding into one or more different formats and/or bitrates of the television programming based on the selection of the tablet computer. DDMM 183 may access a device information database that indicates compatible formats and/or bitrates for various types of user devices. As an example, at least some of the bitrates and/or formats compatible with a particular type of tablet computer may be different from the compatible bitrates and/or formats for another type of tablet computer.

Encoding module 184 may perform encoding into one or more formats and/or bitrates of television programming. These formats and/or bitrates may be selected by DDMM 183. Encoding by encoding module 184 may occur at the date/time scheduled by scheduling module 182. The one or more formats and/or bitrates created by encoding module 184 may be stored at a media store of media stores 194 that is associated with the user account through which the television programming was initially received. Following encoding, the initial copy of the television programming may be deleted by the MDMS.

When a user device of user devices 198 submits a request for television programming to MDMS 181 through network 190, the request may be managed by request management module (RMM) 185. RMM 185 may determine the type of user device that is requesting the television programming, authenticate the user device as associated with particular user account, and/or assess the available bandwidth between MDMS 181 and the user device of user devices 198. If the television programming has not already been encoded by encoding module 184 when the request for the television programming is received by RAM 185, request management module 185 may cause encoding module 184 to prioritize encoding into one or more formats and/or bitrates. The one or more formats and/or bitrates may be selected based on the type of user device from which the request was received. In some embodiments, to preserve processing resources, when such a request is made by RMM 185, only one bitrate and format (or some other subset of the bitrates and/or formats into which the television programming would be encoded when encoding is handling according to the schedule of scheduling module 182) which is known to be compatible with the user device from which the request was received is encoded. If a request from a user device is received by request management module 185 ahead of the time scheduled for encoding by scheduling module 182, the later scheduled encoding may be canceled.

Figure 2:
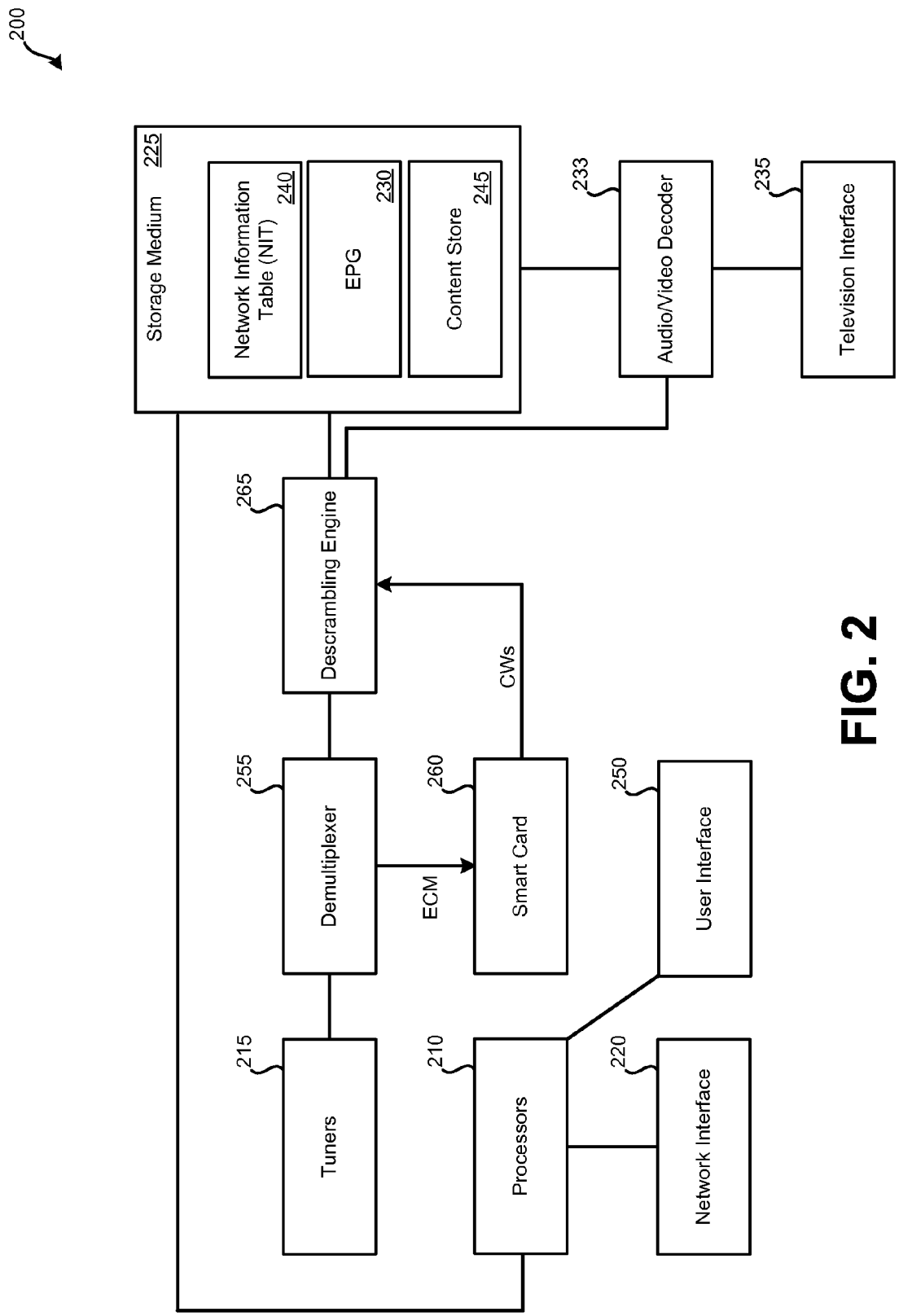
FIG. 2 illustrates an embodiment of a set-top box (STB)/television receiver.

FIG. 2 illustrates a block diagram of an embodiment of a DVR of FIG. 1, illustrated herein as DVR 150A. DVRs 196 of FIG. 1B may include similar components as illustrated in DVR 150A. While DVR 150A is illustrated as an external device, it is to be appreciated that components of DVR 150A may be incorporated into a display device, such as television 160 of FIG. 1. DVR 150A may include: processors 210, tuners 215, network interface 220, non-transitory computer-readable storage medium 225 (storage medium, for short), electronic programming guide (EPG) 230, television interface 235, networking information table (NIT) 240, content store 245, user interface 250, demultiplexer 255, smart card 260, and/or descrambling engine 265 and a recording module 270. In other embodiments of DVR 150A, fewer or greater numbers of components may be present. It should be understood that the various components of DVR 150A may be implemented using hardware, firmware, software, and/or some combination thereof. For example, EPG 230 may be executed by processors 210.

FIG. 2 illustrates an embodiment of DVR 150A, which may typically be in the form of a separate device configured to be connected with a presentation device, such as a television. Embodiments of DVR 150A may also be referred to as a "television receiver." In addition to being in the form of an DVR or STB, a television receiver may be incorporated into another device, such as a television. For example, a television may have an integrated television receiver (which does not involve an external STB being coupled with the television) for receiving content from one or more of a cable, satellite, IPTV, over-the-top (OTT) or terrestrial distribution network. A television receiver may contain some or all of the components of DVR 150A and/or may be able to perform some or all of the functions of DVR 150A. Accordingly, instances in this document referring to an DVR and steps being performed by an DVR may also be performed, more generally, by any type of television receiver device.

Processors 210 may include one or more general-purpose processors configured to perform processes such as coordinating tuning to a particular channel, displaying the EPG, and/or receiving and processing input from a user. Processors 210 may include one or more special purpose processors. For example, processors 210 may include one or more processors dedicated to decoding video signals from a particular format, such as MPEG, for output and display on a television and for performing descrambling. It should be understood that the functions performed by various modules of FIG. 2 may be performed using one or more physical processors or systems-on-chip (SOCs). As such, for example, functions of descrambling engine 265 may be performed by processor 210.

Tuners 215 may include one or more tuners used to tune to television channels, such as television channels transmitted via satellite or cable. Each tuner contained in tuners 215 may be capable of receiving and processing a single stream of data from a satellite transponder (or a cable RF channel) at a given time. As such, a single tuner may tune to a single transponder (or cable RF channel). If tuners 215 include multiple tuners, one tuner may be used to tune to a television channel on a first transponder for display using a television, while another tuner may be used to tune to a television channel on a second transponder for recording and viewing at some other time. Still another tuner may be used to check various television channels to determine if they are available or not. If multiple television channels transmitted on the same transponder stream are desired, a single tuner of tuners 215 may be used to receive the signal containing the multiple television channels for presentation and/or recording.

Network interface 220 may be used to communicate via an alternate communication channel with a television service provider. For example, the primary communication channel may be via satellite (which may be unidirectional to the STB) and the alternate communication channel (which may be bidirectional) may be via a network, such as the Internet. Referring back to FIG. 1, DVR 150A may be able to communicate with television service provider system 110 via network 190, such as the Internet. This communication may be bidirectional: data may be transmitted from DVR 150A to television service provider system 110 and from television service provider system 110 to DVR 150A. Referring back to FIG. 2, network interface 220 may be configured to communicate via one or more networks, such as the Internet, to communicate with television service provider system 110 of FIG. 1. Information may be transmitted and/or received via network interface 220. Referring to timers, if a user uses an interface of DVR 150A to create a timer, network interface 220 may be used to transmit the timer to a timer management computer system. Further, network interface 220 may be used to receive the timer from the timer management computer system. If network interface 220 can properly communicate with the timer management computer system via the Internet, network interface 220 may periodically ping the timer management computer system or some other computer system of the television service provider so that the television service provider is aware of the network connection between DVR 150A and the television service provider. In some embodiments, DVR 150A may periodically use network interface 220 to check the timer management computer system for any new timers.

Storage medium 225 may represent a non-transitory computer readable storage medium. Storage medium 225 may include memory and/or a hard drive. Storage medium 225 may be used to store information received from one or more satellites and/or information received via network interface 220. Storage medium 225 may store information related to EPG 230, NIT 240, and/or content store 245. Recorded television programs may be stored using storage medium 225.

EPG 230 may store information related to television channels and the timing of programs appearing on such television channels. EPG 230 may be stored using storage medium 225, which may be a hard drive. EPG 230 may be used to inform users of what television channels or programs are popular and/or provide recommendations to the user. EPG 230 may provide the user with a visual interface displayed by a television that allows a user to browse and select television channels and/or television programs for viewing and/or recording into content store 245. Information used to populate EPG 230 may be received via network interface 220 and/or via satellites, such as satellites 130 of FIG. 1 via tuners 215. For instance, updates to EPG 230 may be received periodically via satellite. EPG 230 may serve as an interface for a user to control recording module 270 to enable viewing and/or recording of multiple television channels simultaneously.

Audio/video decoder 233 may serve to convert encoded video and audio into a format suitable for output to a display device. For instance, audio/video decoder 233 may receive MPEG video and audio from storage medium 225 or descrambling engine 265 to be output to a television. Audio/video decoder 233 may convert the MPEG video and audio into a format appropriate to be output to a television or other form of display device and audio into a format appropriate to be output to speakers, respectively.

Television interface 235 may serve to output a signal to a television (or another form of display device) in a proper format for display of video and playback of audio. As such, television interface 235 may output one or more television channels, and stored television programming from storage medium 225 (e.g., content store 245 and/or information from EPG 230) to a television for presentation.

The network information table (NIT) 240 may store information used by DVR 150A to access various television channels. NIT 240 may be stored using storage medium 225. Information used to populate NIT 240 may be received via satellite (or cable) through tuners 215 and/or may be received via network interface 220 from the television service provider. As such, information present in NIT 240 may be periodically updated. NIT 240 may be locally-stored by DVR 150A using storage medium 225. Information that may be present in NIT 240 may include: television channel numbers, a satellite identifier, a frequency identifier, a transponder identifier, an ECM PID, one or more audio PIDs, and a video PID (A second audio PID of a channel may correspond to a second audio program (SAP), such as in another language). In some embodiments, NIT 240 may be divided into additional tables. For example, rather than the specific audio PIDs and video PIDs being present in NIT 240, a channel identifier may be present within NIT 240 which may be used to lookup the audio PIDs and video PIDs in another table.

Table 1 provides a simplified example of NIT 240 for several television channels. It should be understood that in other embodiments, many more television channels may be represented in NIT 240. NIT 240 may be periodically updated by a television service provider. As such, television channels may be reassigned to different satellites and/or transponders, and DVR 150A may be able to handle this reassignment as long as NIT 240 is updated.

TABLE 1

| Channel | Satellite | Transponder | ECM PID | Audio PIDs | Video PID |
|---------|-----------|-------------|---------|------------|-----------|
| 4       | 1         | 2           | 27      | 1001       | 1011      |
| 5       | 2         | 11          | 29      | 1002       | 1012      |
| 7       | 2         | 3           | 31      | 1003       | 1013      |
| 13      | 2         | 4           | 33      | 1003, 1004 | 1013      |

It should be understood that the values provided in Table 1 are for example purposes only. Actual values, including how satellites and transponders are identified, may vary. Additional information may also be stored in NIT 240. Additional information on how NIT 240, as indicated in Table 1, may be used is provided in reference to FIG. 3. Video and/or audio for different television channels on different transponders may have the same PIDs. Such television channels may be differentiated based on which satellite and/or transponder a tuner is tuned to.

Recording module 270 may permit a television channel to be recorded for a period of time at a particular time/date in content store 245. Recording module 270 may receive and store timers that are used by processors 210 to determine when a television channel should be tuned to and recorded to content store 270 of storage medium 225. In some embodiments, a limited amount of storage medium 225 may be devoted to content store 245. Timers may be set by the television service provider and/or one or more users of the STB. Recording module 270 may be configured by a user to record particular television programs. Whether a user directly tunes to a television channel or a recording module 270 coordinates tuning to a first television channel, NIT 240 may be used to determine the satellite, transponder, ECM PID (packet identifier), audio PID, and video PID.

User interface 250 may include a remote control (physically separate from DVR 150A) and/or one or more buttons on DVR 150A that allow a user to interact with DVR 150A. User interface 250 may be used to select a television channel for viewing, viewing EPG 230, and/or programming recording module 270.

Referring back to tuners 215, television channels received via satellite (or possibly cable) may contain at least some encrypted data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID) which, in combination with NIT 240, can be determined to be associated with a particular television channel. Particular data packets, referred to as entitlement control messages (ECMs), may be periodically transmitted. ECMs may be encrypted; DVR 150A may use smart card 260 to decrypt ECMs. Decryption of an ECM may only be possible if the user has authorization to access the particular television channel associated with the ECM. When an ECM is received by demultiplexer 255 and the ECM is determined to correspond to a television channel being stored and/or displayed, the ECM may be provided to smart card 260 for decryption.

When smart card 260 receives an encrypted ECM from demultiplexer 255, smart card 260 may decrypt the ECM to obtain some number of control words. In some embodiments, from each ECM received by smart card 260, two control words are obtained. In some embodiments, when smart card 260 receives an ECM, it compares the ECM to the previously received ECM. If the two ECMs match, the second ECM is not decrypted because the same control words would be obtained. In other embodiments, each ECM received by smart card 260 is decrypted; however, if a second ECM matches a first ECM, the outputted control words will match; thus, effectively, the second ECM does not affect the control words output by smart card 260.

When an ECM is received by smart card 260, it may take a period of time for the ECM to be decrypted to obtain the control words. As such, a period of time, such as 2 seconds, may elapse before the control words indicated by the ECM can be obtained. Smart card 260 may be permanently part of DVR 150A or may be configured to be inserted and removed from DVR 150A.

Demultiplexer 255 may be configured to filter data packets based on PIDs. For example, if a transponder data stream includes multiple television channels, data packets corresponding to a television channel that is not desired to be stored or displayed by the user may be ignored by demultiplexer 255. As such, only data packets corresponding to the one or more television channels desired to be stored and/or displayed may be passed to either descrambling engine 265 or smart card 260. Other data packets may be ignored. For each channel, a stream of video packets, a stream of audio packets and/or a stream of ECM packets may be present, each stream being identified by a PID. In some embodiments, a common ECM stream may be used for multiple television channels. Additional data packets corresponding to other information, such as updates to NIT 240, may be appropriately routed by demultiplexer 255.

Demultiplexer 255 may further be configured to route entitlement management messages (EMMs) that are addressed to the DVR 150A, the smart card 260 and/or processors 210. An entitlement management message may include an address, such as a serial number of smart card 260, such that the EMM is only processed by the appropriate television receiver (such as DVR 150A). EMMs that are received but are not addressed to the television receiver may be ignored or otherwise discarded. An EMM may be processed using processors 210 to determine whether a timer has been transmitted to the DVR 150A via a transponder stream. Such an EMM may be used by processors 210 to configure recording module 270 to record a particular television channel for a particular time period on a particular date. As such, an EMM may be received via a transponder stream that contains television programming. The EMM may be received as packetized data that is interspersed with audio and video television programming packets. An EMM may initially be processed by smart card 260, then passed to processors 210.

Descrambling engine 265 may use the control words output by smart card 260 in order to descramble video and/or audio corresponding to television channels for storage and/or presentation. Video and/or audio data contained in the transponder data stream received by tuners 215 may be scrambled. The video and/or audio may be descrambled by descrambling engine 265 using a particular control word. Which control word output by smart card 260 to be used for successful descrambling may be indicated by a scramble control identifier present within the data packet containing the scrambled video or audio. Descrambled video and/or audio may be output by descrambling engine 265 to storage medium 225 for storage (via recording module 270) and/or to audio/video decoder 233 for output to a television or other presentation equipment via television interface 235.

For simplicity, DVR 150A of FIG. 2 has been reduced to a block diagram; commonly known parts, such as a power supply, have been omitted. Further, some routing between the various modules of DVR 150A has been illustrated. Such illustrations are for exemplary purposes only. Two modules not being directly or indirectly connected do not indicate that the modules cannot communicate. Rather, connections between modules of the DVR 150A are intended only to indicate possible common data routing. It should be understood that the modules of DVR 150A may be combined into a fewer number of modules or divided into a greater number of modules. Further, the components of DVR 150A may be part of another device, such as a television. Also, while DVR 150A may be used to receive, store, and present television channels received via a satellite, it should be understood that similar components may be used to receive, store, and present television channels via a cable network.

Figure 3:
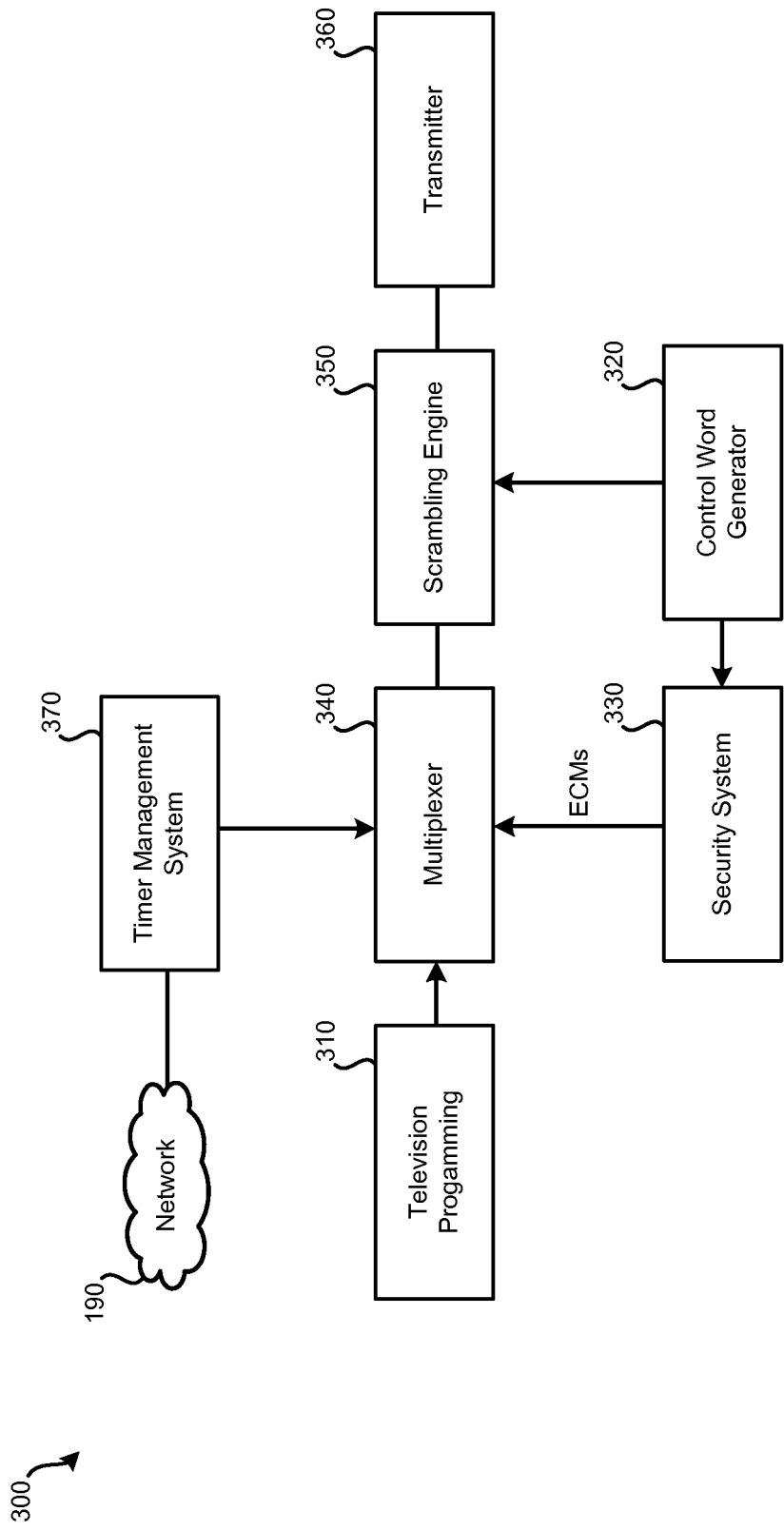
FIG. 3 illustrates an embodiment of a television service provider system.

FIG. 3 illustrates an embodiment of a television service provider system 300. Television service provider system 300 may be part of television service provider system 110 of FIG. 1. As such, before data is transmitted to television receivers via satellite, television service provider system 300 may be used to scramble video and/or audio packets to prevent unauthorized users from accessing television programming. Television service provider system 300 may include: television programming module 310, control word generator 320, security system 330, multiplexer 340, scrambling engine 350, transmitter 360, timer management system 370, and user account database 375.

Television programming module 310 may receive television channels from multiple different sources, such as directly from the networks that produced the content on the television channels. Each television channel that is to be transmitted on a particular transponder stream via a transponder of the satellite may be provided to multiplexer 340. Multiplexer 340 may create a digital stream of data packets containing the video, audio, and other data, such as ECMs, to be transmitted on the transponder data stream. The data stream, which includes video and/or audio data packets that are not scrambled, may be passed to scrambling engine 350. Scrambling engine 350 may use a control word to scramble video or audio present in a data packet. Some audio and video packets may also pass through with no scrambling, if desired by the television service provider.

Control word generator 320 may generate the control word that is used by scrambling engine 350 to scramble the video or audio present in the data packet. Control words generated by control word generator 320 may be passed to security system 330, which may be operated by the television service provider or by a third-party security provider. The control words generated by control word generator 320 may be used by security system 330 to generate an ECM. Each ECM may indicate two control words. The control words indicated may be the current control word being used to scramble video and audio, and the control word that will next be used to scramble video and audio. Security system 330 may output an ECM to multiplexer 340 for transmission to subscribers' television receivers. Each data packet, whether it contains audio, video, an ECM, or some other form of data, may be associated with a particular PID. This PID may be used by the television receiver in combination with the networking information table to determine which television channel the data contained within the data packet corresponds. After video and audio contained within data packets have been scrambled by scrambling engine 350, the transponder data stream may be transmitted by transmitter 360 to a satellite, such as satellite 130-1 of FIG. 1, for relay to subscribers' television receivers, such as DVR 150. Accordingly, the transponder data stream transmitted by transmitter 360 contains scrambled video packet stream and audio packet stream and also contains an encrypted ECM packet stream which contains the control words necessary to descramble the scrambled video and audio packets.

Timer management system 370, which may include one or more computer systems (e.g., servers), may be configured to receive timers from users via network 190. In some embodiments, such timers may be received via a media distribution management system, such as MDMS 181 of FIG. 1B. The timers received by timer management system 370 via network 190 may be received from DVRs and/or other user devices, such as mobile phones or tablet computers. A timer may include an indication of the associated user account. The timer may also include an indication of which DVRs associated with the user account should record the television programming indicated by the timer. As an example, referring to FIG. 1B, a timer may be provided to timer management system 370 from a user device associated with a user account. This timer may be distributed by timer management system 370 to one or more DVRs associated with the user account.

Timer management system 370, upon receiving a timer from a user (via either a DVR or some other user device) via network 190, may determine which other DVRs associated with the user account are to receive the timer using user account database 375. By receiving an identifier of the user's account or, if the timer is received from a DVR by using the serial number of the DVR's smart card, the other DVRs associated with the user's account may be determined using user account database 375.

Upon receiving a timer from either a DVR or some other user device, timer management system 370 may determine one or more (other) DVRs to which the timer should be distributed. For DVRs that are expected to be available via network 190, timer management system 370 may push the timer to the DVRs or may store the timer such that when the DVR contacts timer management system 370, the timer is retrieved. For DVR that are determined to be unavailable via network 190, timer management system 370 may create an EMM for the DVR that indicates an address of the DVR (e.g., a serial number of a smart card) and the time. The EMM may be sent by timer management system 370 to multiplexer 340. The EMM may be transmitted as part of one or more transponder streams to one or more satellites via transmitter 360. In some embodiments, the EMM may be transmitted as part of each transponder stream that is sent to transmitter 360. The EMM may be transmitted by transmitter 360 via one or more transponder streams to one or more satellites, which then distribute the EMM to all of the DVRs in a geographical area (such as, all of the DVRs in a country or region). As such, many television receivers, including those associated with other users, may receive the EMM. Each television receiver that is not associated with the address of the television receiver may ignore the EMM once it has been determined the EMM is not addressed to that STB. As such, while a large number of television receivers may receive the EMM, only the DVR associated with the address indicated in the EMM may process the EMM and set a timer in response to the EMM. An EMM may be sent for each STB associated with the user account that could not be contacted via network 190. In some embodiments, EMMs are sent to each DVR at which the timer is to be set, and network 190 is used for receiving timers by timer management system 370, but not sending timers.

For simplicity, television service provider system 300 of FIG. 3 has been reduced to a block diagram; other common components have been omitted. Further, some routing between the various modules of television service provider system 300 has been illustrated. Such illustration is for exemplary purposes only. Regardless of whether two modules are directly or indirectly connected, the modules may be able to communicate. Connections between modules are intended only to indicate possible common routing. It should be understood that the modules of television service provider system 300 may be combined into a fewer number of modules or divided into a greater number of modules.

Figure 4:
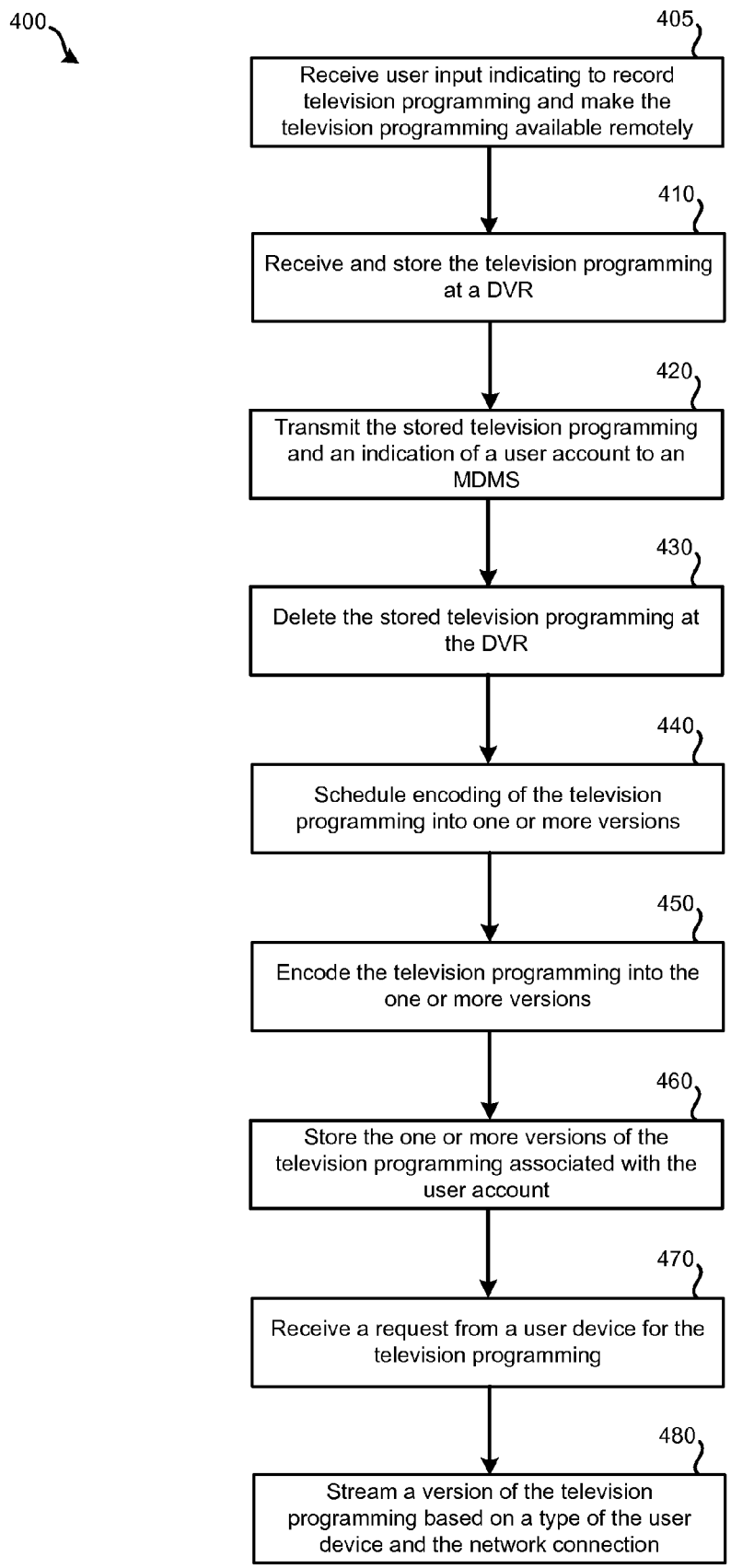
FIG. 4 illustrates an embodiment of a method for providing remote access to television programming recorded by a television receiver.

Various methods may be performed with the systems and devices of FIGS. 1-3. FIG. 4 illustrates an embodiment of a method 400 for providing remote access to television programming recorded by a DVR. Method 400 may be performed using the satellite television distribution system of FIGS. 1 and 1B, one or more DVRs (or other forms of television receivers) similar to DVR 150A of FIG. 2, and/or the television service provider system of FIG. 3. Method 400 may also be performed using other forms of satellite television distribution systems, television receivers, and/or television service provider systems. Some or all of the components of these systems and devices may be used in performing method 400. One or more computerized devices (e.g., computer systems) may be used in performing method 400. As such, means for performing method 400 includes some or all of the components of satellite television distribution systems 100 and 100B, DVR 150A, and/or television service provider system 300. In addition to method 400 being performed using a satellite-based television distribution system, a cable television or IPTV network may be used.

At step 405, user input that indicates television programming is to be recorded may be received. This user input may be received directly (e.g., via a remote control) by the DVR that is to record the television programming. Alternatively, this user input may be received by a timer management system, such as timer management system 370 of FIG. 3. The timer management system may have received the user input from a user device (e.g., a cellular phone or tablet computer) via a network (e.g., network 190, which may be the Internet). The user input may define a timer. The timer may indicate a date, a time period and a particular television channel that is to be recorded. The timer may be reoccurring, meaning the timer may occur at the same time period and record the same television channel each week. In some embodiments, a user may provide the timer by selecting a television program from an electronic programming guide (EPG) and indicating that the television program is to be recorded. If a timer management system received the user input defining the timer, the timer management system may distribute the timer to one or more set top boxes which are to record the television programming. In some embodiments, this may involve an EMM being transmitted to the DVR via a satellite-based television distribution network or storing an indication regarding the timer that is retrieved by the DVR. In some embodiments, if the timer is set for recording television programming to be recorded before the DVR is scheduled to contact the timer management system to retrieve any new timers, the timer may be transmitted to the DVR via an EMM.

Additionally, at step 405, user input may be received that indicates the television programming is to be made available remotely. As such, in addition to, or instead of, the television programming associated with the timer being available for local playback after recording at the television receiver that performed the recording, the television programming may be available for playback at one or more remote user devices (and/or other television receivers). In some embodiments, the user input to indicate that the television programming is desired to be available for remote playback may not be necessary. In some embodiments, when a user selects television programming from an EPG for recording, the user may provide input indicating the television programming is to be made available remotely.

At step 410, at the date and time period indicated by the timer, the DVR may receive and store (record) the television programming. Initially, the television programming may be stored locally by the DVR, such as using a non-transitory computer readable storage medium, such as a hard drive. In some embodiments, during or after the television programming having been stored by the DVR, the user may provide input indicating that the television programming is to be available via one or more user devices and, thus, the television programming may be desired to be stored remotely by an MDMS.

At step 420, the stored television programming may be transferred from the DVR to an MDMS, such as MDMS 181 of FIG. 1B. An indication of a user account may be transmitted to the MDMS. This indication may be a user account number, a username, an IP address of the DVR, a MAC address of the DVR, a serial number of the DVR (e.g., a serial number of the smartcard of the DVR), or some other identifier that may be used to distinguish the user account from other user accounts. The stored television programming may begin being transferred to the remote storage system while step 410 is in progress. Alternatively, the television programming may be transferred to the remote storage system after the television programming has been fully received and stored at step 410. At the remote storage system, the television programming received from the DVR may be associated with the user account such that the television programming can only be used in association with the user account and not any other user account. Accordingly, if a second user associated with a second user account wanted access to the television programming, the second user may be required to separately provide input selecting the television programming for recording using an DVR associated with the second user and then provide the television programming to the MDMS for separate storage and encoding.

At step 430, once the television programming has been successfully received by the remote storage system, the television programming may be deleted from the DVR. This deletion may occur in chunks. For example, after a chunk (a portion of predefined length) of the television programming has successfully been transmitted to the remote storage system at step 420, that chunk may be deleted from DVR at step 430. In some embodiments, the stored television programming is maintained at the DVR until the television programming has been successfully received in full by the remote storage system; then deletion at the DVR may occur. As such, deletion may be necessary such that only one recorded copy of the television programming is maintained that is associated with the user account. Copyright laws and regulations may dictate that only a single copy of the television programming may be associated with the user that selected the television programming for recording.

At step 440, encoding into one or more formats at one or more bitrates may be scheduled. In some embodiments, if processing resources are available, encoding may occur immediately by the MDMS. Referring to FIG. 1B, scheduling module 182 of MDMS 181 may perform the scheduling and encoding module 184 may perform the encoding. In some embodiments, the scheduling may be based on a first in, first out basis. The television programming may be placed in a queue along with television programming received from other set top boxes associated with other users. The television programming may be encoded in the order of the queue. In other embodiments, the television programming received from the user may be assigned to particular date and time or time period for encoding.

Historical data about the user and/or the user account may be used to determine the scheduling of the encoding of the television programming. For instance, the average time or shortest time that has elapsed between when television programming is recorded (or provided to the MDMS) and when the user typically requests playback via a user device may be used to schedule encoding. Based on this average time or the shortest time, encoding may be scheduled such that the one or more encoded versions of the television programming are likely available ahead of when the user is expected to request playback via a user device. As an example of this, if the amount of time that elapses between when television programming is typically recorded and when the user requests playback via a user device is 24 hours, encoding may be scheduled to occur within 24 hours of receipt of the television programming by the MDMS. Therefore, for a first user account that is associated with television programming that is requested from a user device sooner than a second account, the scheduling may be set to encode the television programming for the first user account ahead of the second user account.

In some embodiments, to increase the likelihood that the television programming is not requested from user device before encoding has occurred, a percentage of the typical lag time between recording (or transfer to the MDMS) and request may be used to schedule encoding. Returning to the previous example, if twenty-four hours typically elapse between when the television programming is recorded and when the television programming is requested by the user via a user device for presentation, a 50% safety margin may ensure that encoding occurs within 12 hours of the initial recording (or receipt of the television programming by the MDMS). The greater the safety margin, the more likely the television programming will be encoded according to the schedule ahead of a request from a user device associated with the user account. However, the greater the safety margin, the smaller the window during which the remote storage system may have to schedule the encoding. In some embodiments, when the user requests that the television programming be made available remotely, the user may indicate an estimated time at which the user intends on viewing the television programming. The estimated time (in combination with a safety margin) may be used for scheduling the encoding.

At step 450, the television programming may be encoded into multiple versions. These versions may include different formats and/or different bitrates of the same format. For example, multiple bitrate versions in MPEG-4 may be encoded. One or more versions may be variable bitrate versions. In some embodiments, the MDMS may be configured to encode the television programming into a predefined set of multiple formats and/or multiple bitrates. Accordingly, the television programming received from various different users may each be encoded into a common set of formats and/or bitrates. In other embodiments, the formats and/or bitrates for encoded versions of television programming may be determined based on input from the user and/or the user account. Regarding input from the user, at the time the user indicated that the television programming is to be made available remotely, the user may indicate one or more user devices at which the user intends on viewing the television programming. Based on the types of user devices specified, the formats and/or bitrates of the television programming into which encoding occurs may be determined. In some embodiments, the user may be required to register the user's user devices with the MDMS. Based on the registration of these one or more user devices, the MDMS may maintain a record of the one or more types of user devices associated with a user account. Based on the types of user devices, one or more formats and/or bitrates for the encoded versions may be determined.

In some embodiments, the MDMS may have access to a database that links various types (e.g., categories, models, manufacturers) of user devices with specific formats and/or bitrates. For example, while two user devices may be of the same category, such as tablet computers, a different format and/or bitrate may be appropriate for a tablet computer manufactured by Apple™ as opposed to a tablet computer manufactured by Microsoft™. In some embodiments, the MDMS may maintain a record of types of user devices that have previously been used by the user to view television programming remotely. Based on this historical record, the one or more formats and/or one or more bitrates may be selected by the MDMS for encoding. It should be understood that a hybrid of some of these methods may also be used: for example, initially, a predefined set of formats and/or bitrates may be used for encoding television programming; however, over time, the MDMS may capture historical data that indicates the user tends to request television programming from a particular type of user device. Based on this assessment, the formats and/or bitrates may be selected for future encoding based on this particular type of user device.

The multiple versions encoded at step 450 may be stored at step 460 by the MDMS. Each of these versions may be associated with the user account, such that users that are not associated with the user account cannot access these stored versions. Accordingly, if another user wants access to the same content, this other user may be required to record the television programming, transfer the television programming to the MDMS, and have the television programming coded. More generally, while the same television programming may be provided to the MDMS for remote access and encoding, individual encoded versions of the television programming may be maintained for each user account.

After an amount of time, a request may be received from a user device for the television programming at step 470. The request may indicate the user account (e.g., a username and password). The request received at step 470 may occur after the scheduled time for encoding. As such, the encoding of step 450 and the storing of step 460 by the MDMS may have already occurred. At step 480, one of the one or more formats and/or one or more bitrate versions of the television programming may be streamed to the user device by the MDMS. Such streaming may be contingent on authenticating the user's access to the user account. The format and/or bitrate version of the television programming streamed to the user device may be based on the type of user device and/or the bandwidth available on the network connection between the MDMS and the user device. In a particular format, multiple different bitrate versions of the television programming may be suitable to stream to the user device. The appropriate version may be selected based on the bandwidth available between the MDMS and the user device. As the available bandwidth changes, the version of the television programming used to stream to the user device may change. The version may be selected based on a rate of how quickly chunks of the television programming are received by the user device (e.g., if the receive rate is below a threshold, a lower bitrate version of the television programming may be used for streaming). In some embodiments, rather than streaming the television programming, one or more versions of the television programming are transferred to the user device for later playback. If such a transfer occurs, each version of the television programming stored by the MDMS may be deleted for copyright reasons. As such, a recording of the television programming may only be stored in one place at a given time.

Figure 5:
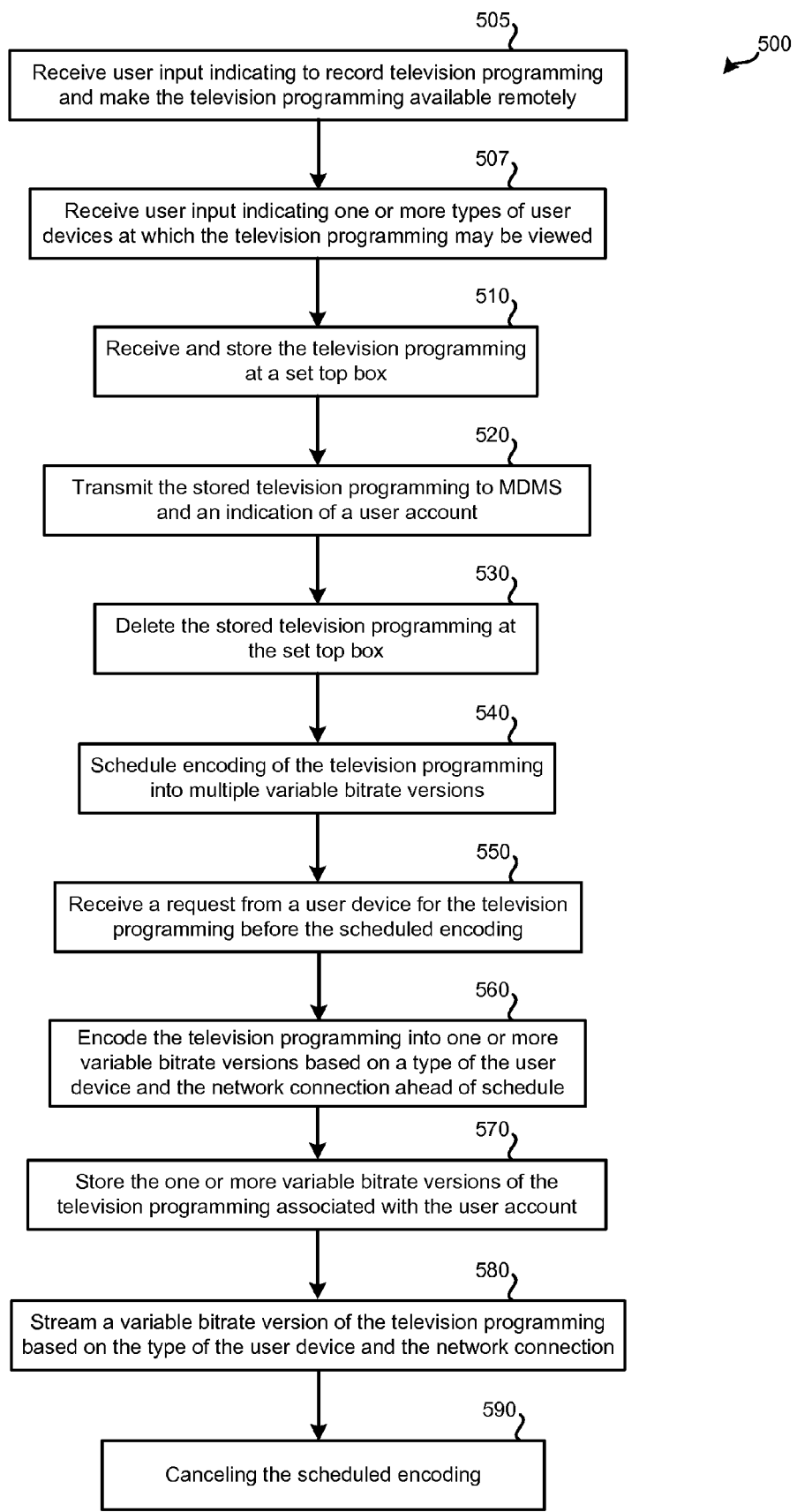
FIG. 5 illustrates another embodiment of a method for providing remote access television programming recorded by a television receiver.

FIG. 5 illustrates an embodiment of a method 500 for providing remote access television programming recorded by a DVR. Method 500 may be performed using the satellite television distribution system of FIGS. 1 and 1B, one or more DVRs (or other forms of television receivers) similar to DVR 150A of FIG. 2, and/or the television service provider system of FIG. 3. Method 500 may also be performed using other forms of satellite television distribution systems, television receivers, and/or television service provider systems. Some or all of the components of these systems and devices may be used in performing method 500. One or more computerized devices (e.g., computer systems) may be used in performing method 500. As such, means for performing method 500 includes some or all of the components of satellite television distribution systems 100 and 100B, DVR 150A, and/or television service provider system 300. In addition to method 500 being performed using a satellite-based television distribution system, a cable television or IPTV network may be used.

At step 505, user input that indicates television programming is to be recorded may be received. This user input may be received directly (e.g., via a remote control) by the DVR that is to record the television programming. Alternatively, this user input may be received by a timer management system, such as timer management system 370 of FIG. 3. The timer management system may have received the user input from a user device (e.g., a cellular phone or tablet computer) via a network (e.g., network 190, which may be the Internet). The user input may define a timer. The timer may indicate a date, a time period, and a particular television channel that is to be recorded. The timer may be reoccurring, meaning the timer may occur at the same time period and record the same television channel each week. In some embodiments, a user may provide the timer by selecting a television program from an electronic programming guide (EPG) and indicate that the television program is to be recorded. If a timer management system received the user input defining the timer, the timer management system may distribute the timer to one or more set top boxes which are to record the television programming. In some embodiments, this may involve an EMM being transmitted to the DVR via a satellite-based television distribution network or storing an indication regarding the timer that is retrieved by the DVR. In some embodiments, if the timer is set for recording television programming to be recorded before the DVR is scheduled to contact the timer management system to retrieve any new timers, the timer may be transmitted to the DVR via an EMM.

Additionally, at step 505, user input may be received that indicates the television programming is to be made available remotely. As such, in addition to, or instead of, the television programming associated with the timer being available for local playback after recording at the DVR that performed the recording, the television programming may be available for playback at one or more remote user devices (and/or other television receivers). In some embodiments, the user input to indicate that the television programming is desired to be available for remote playback may not be necessary. In some embodiments, when a user selects television programming from an EPG for recording, the user may provide input indicating the television programming is to be made available remotely.

At step 507, input may be received from the user that identifies the type of user device at which the television programming is expect to be watched. For example, the user may select from a menu of: standard-definition television, high-definition television, laptop computer, tablet computer, mobile phone, smartphone, etc. Further, the user may specify particular models and/or manufacturers of user devices. In some embodiments, rather than the user specifying which one or more user devices may be used to view the television programming, the user may be required to register a user device with the television service provider, such as by logging into a user account with the television service provider via the user device or by installing an application of the television service provider on the user device.

At step 510, at the date and time period indicated by the timer, the DVR may receive and store (record) the television programming. Initially, the television programming may be stored locally by the DVR, such as using a non-transitory computer readable storage medium, such as a hard drive. In some embodiments, during or after the television programming having been stored by the set top box, the user may provide input indicating that the television programming is to be available via one or more user devices and, thus, the television programming may be desired to be stored remotely by an MDMS.

At step 520, the stored television programming may be transferred from the set top box to an MDMS, such as MDMS 181 of FIG. 1B. An indication of a user account may be transmitted to the MDMS. This indication may be a user account number, a username, an IP address of the STB, a MAC address of the STB, a serial number of the DVR (e.g., a serial number of the smartcard of the DVR), or some other identifier that may be used to distinguish the user account from other user accounts. The stored television programming may begin being transferred to the MDMS while step 510 is in progress. Alternatively, the television programming may be transferred to the remote storage system after the television programming has been fully received and stored at step 510. At the MDMS, the television programming received from the set top box may be associated with the user account such that the television programming can only be used in association with that particular user account and not any other user account.

At step 530, once the television programming has been successfully received by the MDMS, the television programming may be deleted from the DVR. This deletion may occur in chunks. For example, after a chunk (a portion of predefined length) of the television programming has successfully been transmitted to the MDMS at step 520, that chunk may be deleted from DVR at step 530. In some embodiments, the stored television programming is maintained at the DVR until the television programming has been successfully received in full by the MDMS; then deletion at the DVR may occur. As such, deletion may be required such that only one recorded copy of the television programming is maintained that is associated with the user account.

At step 540, encoding into one or more formats and/or one or more bitrates may be scheduled. In some embodiments, if processing resources are available, encoding may occur immediately by the MDMS. Referring to FIG. 1B, scheduling module 182 of MDMS 181 may perform the scheduling and encoding module 184 may perform the encoding. Scheduling may occur according to one or more of the arrangements detailed in relation to step 440 of method 400.

In method 400, the scheduled encoding occurs before a request is received from user device for the television programming that is encoded. However, in method 500, a request for the television programming from user device is received ahead of the television programming being encoded. This may occur if the user requests the television programming from the user device shortly after the television programming has been transferred to the MDMS. As an example, a user may typically request television programming one or two days after the television programming is uploaded to the MDMS. As such, the encoding may be scheduled for twelve hours after the television programming is received by the MDMS. However, in this example, the user may request the television programming for presentation on the user device only a couple hours after the television programming has been received by the MDMS; as such, the encoding has not yet occurred. At step 550, the request may be received for the television programming from a user device ahead of the encoding of the television programming having occurred. The request may indicate the user account (e.g., a username and password). Streaming may be contingent on authenticating the user's access to the user account. The request may be received by RMM 185 of FIG. 1B. RMM 185 may request encoding module 184 of MDMS 181 perform the encoding.

At step 560, the television programming may be encoded such that an encoded version of the television programming may be provided to the user device. Rather than encoding the television programming into a set of multiple formats and/or bitrates, the television programming may be encoded into a more limited set of formats and/or bitrates because the encoding is happening ahead of schedule. For example, only formats and/or bitrates that are appropriate for the user device from which the request was received at step 550 may be encoded at step 560. In some embodiments, a single format and bitrate encoded version of the television programming may be created. The format and/or bitrate of the encoded television programming may be based on the type of user device and/or the bandwidth between the user device and the MDMS. Destination device management module 183 of FIG. 1B may determine bitrates and/or formats appropriate for user devices.

The versions encoded at step 560 may be stored at step 570 by the MDMS. Referring to FIG. 1B, the versions may be stored in a media store of media stores 194, wherein the media store is associated with the user account. Each of these versions may be associated with the user account, such that users that are not associated with the user account cannot access these stored versions. Accordingly, if another user wants access to the same content, this other user may be required to record the television programming, transfer the television programming to the MDMS, and have the television programming coded. More generally, while the same television programming may be provided to the MDMS for remote access and encoding, individual encoded versions of the television programming may be maintained for each user account.

At step 580, one of the one or more versions of the television programming created at step 560 may be streamed to the user device by the MDMS. Before the television programming is fully encoded at step 560, encoded chunks of the encoded television programming may be streamed at step 580. Such streaming may be contingent on authenticating the user's access to the user account. The version of the television programming streamed to the user device may be based on the type of user device and/or the bandwidth available on the network connection between the MDMS and the user device. In a particular format, multiple different bitrate versions of the television programming may be suitable to stream to the user device. The appropriate version may be selected based on the bandwidth available between the MDMS and the user device. As the available bandwidth changes, the version of the television programming used to stream to the user device may change. The bitrate may be selected based on a rate of how quickly chunks of the encoded television programming are received by the user device (e.g., if the receive rate is below a threshold, a lower bitrate version of the television programming may be used for streaming).

Encoding occurring at step 560 may result in the scheduled encoding of step 540 being canceled at step 590. As such, only a subset (e.g., one) of the versions in various formats and/or bitrates initially scheduled for encoding at step 540 may be encoded. In some embodiments, rather than canceling the scheduled encoding, the scheduled encoding may proceed at the scheduled time to perform encoding into one or more formats and/or bitrates that were not already created at step 560.

Figure 6:
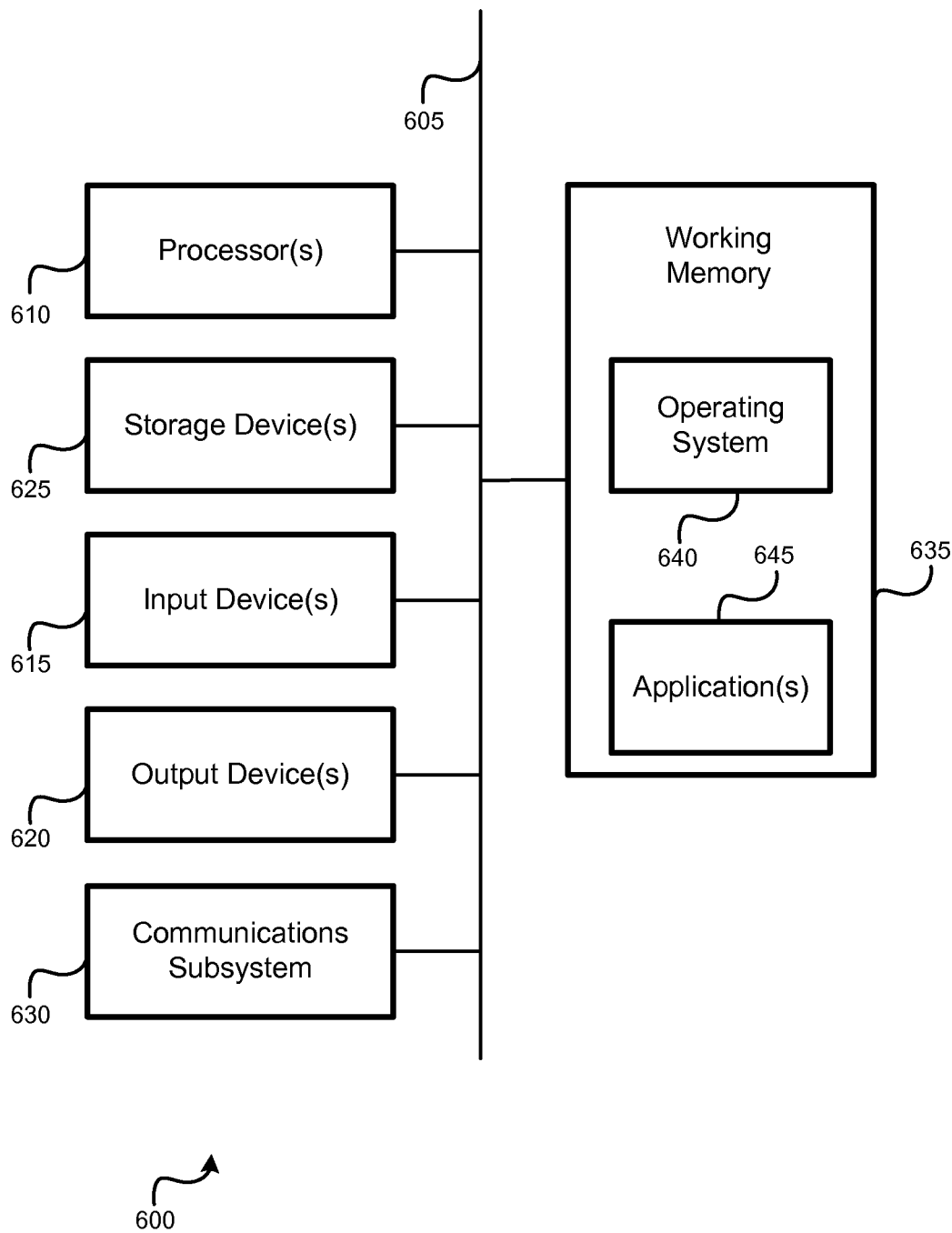
FIG. 6 illustrates an embodiment of a computer system.

A computer system, as illustrated in FIG. 6, may be incorporated as part of the previously described devices. For example, computer system 600 can represent some of the components of the user devices, MDMS, television service provider system, set top boxes, television receivers, televisions, etc. FIG. 6 provides a schematic illustration of one embodiment of a computer system 600 that can perform the methods detailed herein. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset (such as a Bluetooth™ device, an 802.11 device, a WiFi device, a WiMax device, a cellular communication facilities, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented, using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, a hard disk, a magnetic tape, or any other magnetic medium, a CD-ROM, any other optical medium, punchcards, a papertape, any other physical medium with patterns of holes, a RAM, a PROM, an EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system 600 can be distributed across a network. For example, some processing may be performed in one location using a first processor while the other processing may be performed by another processor remote from the first processor. Other components of computer system 600 may be similarly distributed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents, may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for providing remote access to television programming recorded using a television receiver, the method comprising:
   transmitting, by a television service provider system, a broadcast television program to a plurality of television receivers;
   receiving, by the television service provider system, the broadcast television program as recorded by the television receiver of the plurality of television receivers and an indication of a user account associated with the television receiver;
   scheduling, by the television service provider system, encoding of the broadcast television program into at least one format and at least one bitrate;
   encoding, by the television service provider system, the broadcast television program into a format of the at least one format and a bitrate of the at least one bitrate; and
   storing, by the television service provider system, the encoded television program in the format and the bitrate in association with the user account.

2. The method for providing remote access to television programming recorded using the television receiver of claim 1, wherein scheduling of the encoding of the broadcast television program is performed based on historical data associated with the user account.

3. The method for providing remote access to television programming recorded using the television receiver of claim 2, wherein the historical data is indicative of when playback is typically requested in association with the user account.

4. The method for providing remote access to television programming recorded using the television receiver of claim 1, the method further comprising:
   after scheduling but prior to encoding of the broadcast television program, receiving, by the television service provider system, a playback request from a user device associated with the user account, wherein the encoding is performed ahead of schedule in response to the playback request from the user device.

5. The method for providing remote access to television programming recorded using the television receiver of claim 4, wherein the broadcast television program is scheduled to be encoded into a plurality of bit rates and a plurality of formats.

6. The method for providing remote access to television programming recorded using the television receiver of claim 5, wherein, of the plurality of bitrates and the plurality of formats, encoding is performed into only the bitrate and the format associated with the user device from which the playback request was received.

7. The method for providing remote access to television programming recorded using the television receiver of claim 6, the method further comprising:
   streaming, by the television service provider system, the encoded television program to the user device.

8. The method for providing remote access to television programming recorded using the television receiver of claim 1, further comprising:
   maintaining, by the television service provider system, a database that relates a plurality of types of user devices with a plurality of bitrates and a plurality of formats;
   determining, by the television service provider system, a type of user device previously used to playback content in association with the user account; and
   determining, by the television service provider, the at least one bitrate and the at least one format for scheduling the encoding using the database and the determined type of user device previously used to playback content in association with the user account.

9. The method for providing remote access to television programming recorded using the television receiver of claim 1, wherein:
   transmitting the broadcast television program to the plurality of television receivers occurs via a first network; and
   receiving the broadcast television program as recorded by the television receiver occurs via a second network.

10. A media distribution management system for providing remote access to television programming recorded using a television receiver, the media distribution management system comprising:
   one or more processors; and
   a memory communicatively coupled with and readable by the one or more processors and having stored therein processor-readable instructions which, when executed by the one or more processors, cause the one or more processors to:
      receive the broadcast television program as recorded by the television receiver of the plurality of television receivers and an indication of a user account associated with the television receiver;
      schedule encoding of the broadcast television program into at least one format and at least one bitrate;
      encode the broadcast television program into a format of the at least one format and a bitrate of the at least one bitrate; and
      store the encoded television program in the format and the bitrate in association with the user account.

11. The media distribution management system for providing remote access to television programming recorded using the television receiver of claim 10, wherein the processor-readable instructions that, when executed, cause the one or more processors to schedule encoding of the broadcast television program bases scheduling on historical data associated with the user account.

12. The media distribution management system for providing remote access to television programming recorded using the television receiver of claim 11, wherein the historical data is indicative of when playback is typically requested in association with the user account.

13. The media distribution management system for providing remote access to television programming recorded using the television receiver of claim 10, wherein the processor-readable instructions, when executed, further cause the one or more processors to:
  receive a playback request from a user device after scheduling but prior to encoding of the broadcast television program, wherein the processor-readable instructions that, when executed, cause the one or more processors to encode the broadcast television program causes encoding to be performed ahead of schedule in response to the playback request from the user device.

14. The media distribution management system for providing remote access to television programming recorded using the television receiver of claim 13, wherein the processor-readable instructions that, when executed, cause the one or more processors to schedule encoding comprise processor-readable instructions which, when executed, cause the one or more processors to schedule encoding of the broadcast television program into a plurality of bit rates and a plurality of formats.

15. The media distribution management system for providing remote access to television programming recorded using the television receiver of claim 14, wherein, of the plurality of bitrates and the plurality of formats, the processor-readable instructions, when executed, cause the one or more processors to only encode into the bitrate and the format associated with the user device from which the playback request was received.

16. The media distribution management system for providing remote access to television programming recorded using the television receiver of claim 15, wherein the processor-readable instructions, when executed, further cause the one or more processors to:
  stream the encoded television program to the user device.

17. The media distribution management system for providing remote access to television programming recorded using the television receiver of claim 10, wherein the processor-readable instructions, when executed, further cause the one or more processors to:
  maintain a database that relates types of user devices with bitrates and formats;
  determine a type of user device previously used to playback content in association with the user account; and
  determine the at least one bitrate and the at least one format for encoding using the database and the determined type of user device previously used to playback content in association with the user account.

18. A non-transitory processor-readable medium for providing remote access to television programming recorded using a television receiver comprising processor-readable instructions configured to cause one or more processors to:
  receive the broadcast television program as recorded by the television receiver of the plurality of television receivers and an indication of a user account associated with the television receiver;
  schedule encoding of the broadcast television program into at least one format and at least one bitrate;
  encode the broadcast television program into a format of the at least one format and a bitrate of the at least one bitrate; and
  store the encoded television program in the format and the bitrate in association with the user account.

19. The non-transitory processor-readable medium for providing remote access to television programming recorded using the television receiver of claim 18, wherein the processor-readable instructions, when executed, further cause the one or more processors to:
  receive a playback request from a user device associated with the user account after scheduling but prior to encoding of the broadcast television program, wherein the processor-readable instructions are further configured to cause the one or more processors to encode the broadcast television program causes encoding to be performed ahead of schedule in response to the playback request from the user device.

20. The non-transitory processor-readable medium for providing remote access to television programming recorded using the television receiver of claim 18, wherein the processor-readable instructions are further configured to cause the one or more processors to:
  maintain a database that relates a plurality of types of user devices with a plurality of bitrates and a plurality of formats;
  determine a type of user device previously used to playback content in association with the user account; and
  determine the at least one bitrate and the at least one format for encoding using the database and the determined type of user device previously used to playback content in association with the user account.

* * * * *